UNITED STATES PATENT OFFICE.

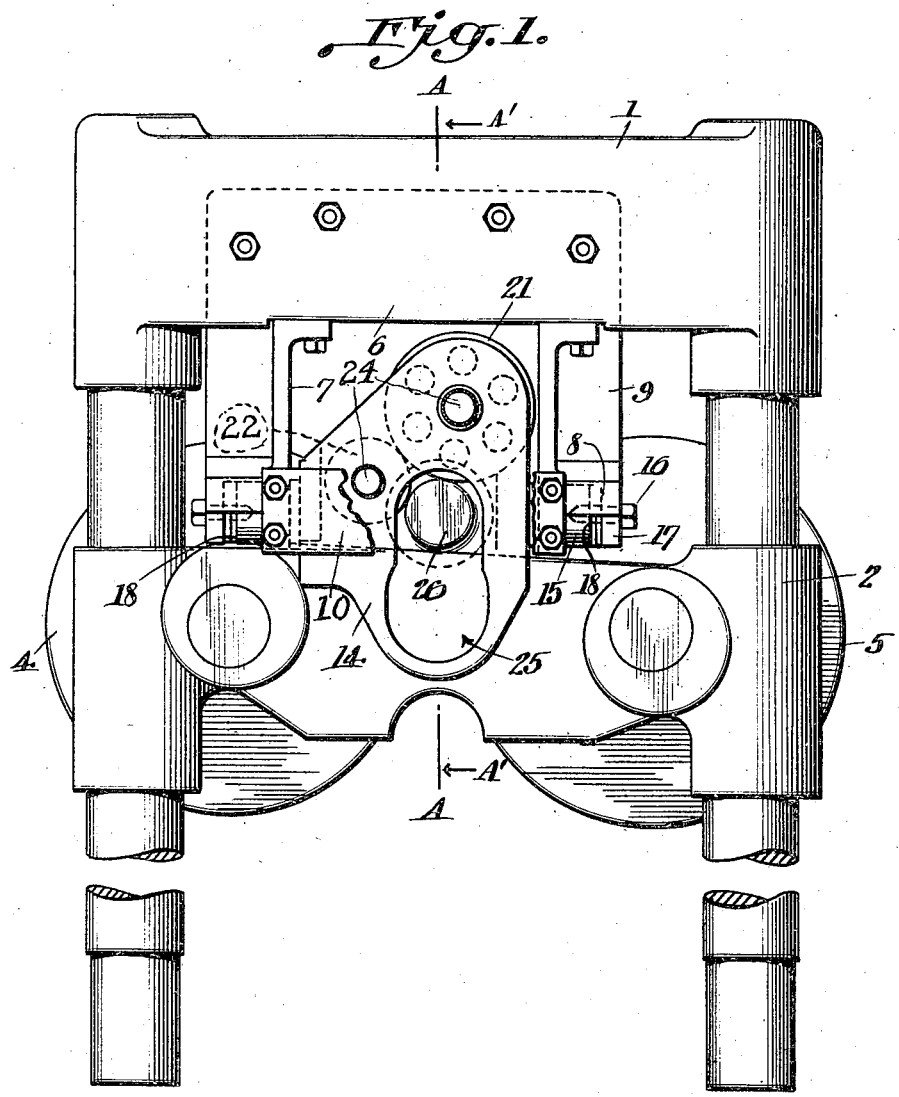

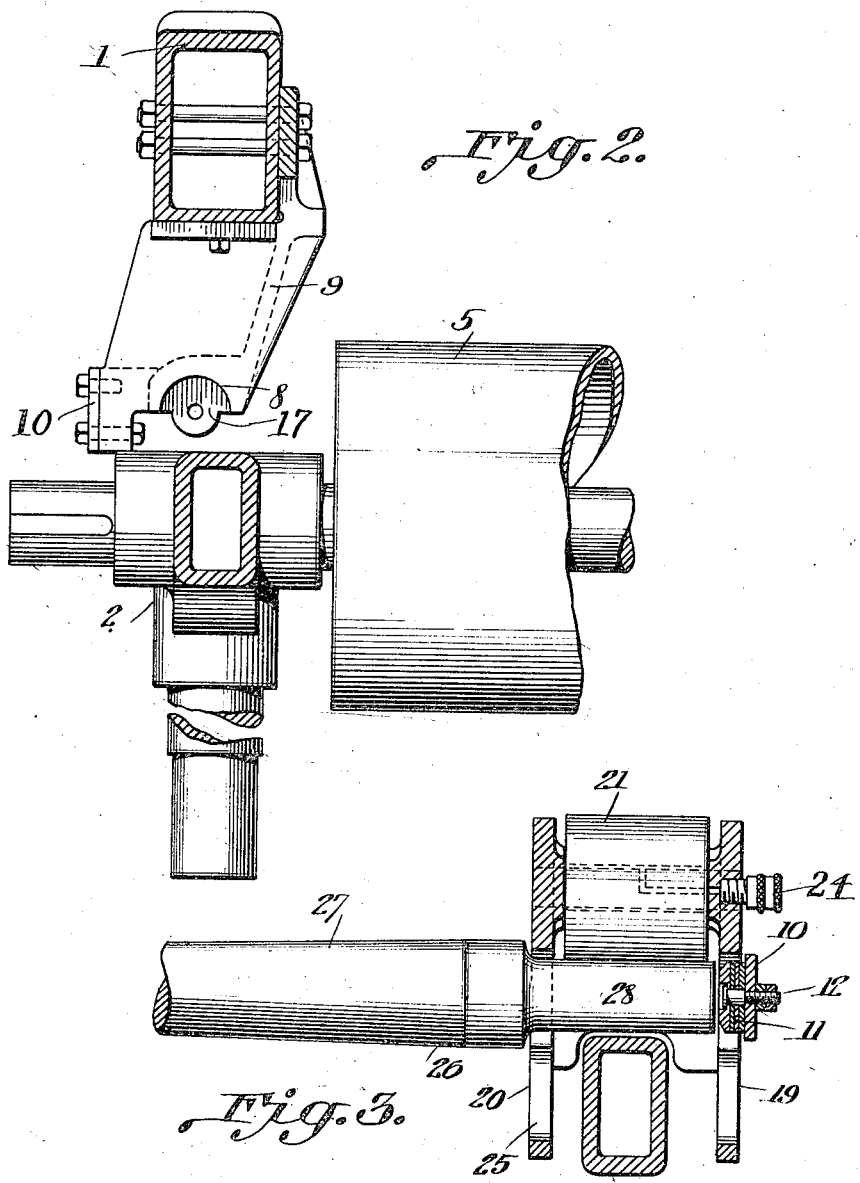

JOHN A. TAFT, OF SAN ANTONIO, TEXAS, ASSIGNOR TO REAGAN BALE COMPANY, OF SAN ANTONIO, TEXAS, A CORPORATION OF TEXAS.

BEARING FOR BALING-PRESSES.

1,251,936.   Specification of Letters Patent.   Patented Jan. 1, 1918.

Application filed December 29, 1916. Serial No. 139,597.

*To all whom it may concern:*

Be it known that I, JOHN A. TAFT, a citizen of the United States, and a resident of the city of San Antonio, in the county of Bexar, State of Texas, have invented certain new and useful Improvements in Bearings for Baling-Presses, of which the following is a specification.

This invention relates broadly to bearings and more particularly to an anti-friction bearing for sustaining heavy pressure.

The principal object of the present invention is to provide an anti-friction bearing for the core bar of a round bale cotton press.

Another and primary object of the present invention is to provide a bearing for the core bar of a round bale cotton press adapted to sustain heavy pressure and wherein no lubricant is required for the bearing portions of the core bar.

A further and more particular object of the present invention is to provide an anti-friction bearing for the purpose specified wherein the bearing rollers are mounted in a trunnion, the axis of which is at substantially right angles to the axis of the core bar whereby the anti-friction rollers of the bearing are self-adjusting so far as any spring or irregularity of the core bar is concerned.

A still further and more particular object of the present invention is to provide a bearing for the purpose and of the character specified wherein the greater portion of the heavy forces are carried on a relatively large roller and the smaller portion of the forces are carried on a smaller roller and wherein both rollers are mounted in a trunnion, the axis of which intersects the axis of the core bar at substantially right angles therefrom in order to permit the parts to assume a position of stable equilibrium and to be sufficiently flexibly mounted to take up inherent irregularities.

Other further objects of the present invention will in part be obvious and will in part be pointed out in the specification hereinafter following by reference to the accompanying drawings wherein like parts are represented by like characters throughout the several figures thereof.

Figure 1 is a detail view illustrating the end of the bearing in elevation.

Fig. 2 is a sectional view taken substantially on the center line A—A of Fig. 1 with the pivot bearing frame removed and looking in the direction of the arrows A'.

Fig. 3 is a detail view taken substantially on the center line A—A of Fig. 1 but only through the bearing frame and showing the large bearing roller and the core bar in full instead of in section.

In order to produce a compact cylindrical cotton bale the baling rollers are mounted to be operated under hydraulic pressure. Where the baling forces are exerted radially between a core bar and compression rollers located on one side only of the core bar, the entire baling pressure must necessarily be sustained by the bearings which support the core bar. In order to produce a compact cotton bale it is necessary that very heavy pressure be exerted between the compression rollers and the core bar. Under this heavy pressure it is difficult to rotate the cotton, the fibers are unduly stretched and may perhaps be seriously injured. In order to obviate these difficulties I have provided anti-friction bearings for the ends of the core bar, and of such construction as to sustain the heavy pressure and to substantially overcome any increase of rotative resistance should the core bar be slightly sprung under the pressure or should any side thrusts or other extraneous abnormal forces come upon the parts in such manner as to produce a slight distortion.

More particularly my invention comprises the mounting of a large bearing roller and a small bearing roller slightly offset therefrom in a bearing frame carried upon trunnions, the axis of which passes through the axis of the core bar when at rest on the bearing rollers, wherein the axes of the core bar, the bearing rollers, and the pressure rollers are all substantially parallel.

Referring now to the drawings, and more particularly to Fig. 1, the press main frame 1 guides a vertically movable cross-head 2 upon which are suitably mounted pressure rolls 4 and 5. This cross-head frame, which carries the pressure rolls, is adapted to be raised by means of a hydraulic press (not shown). The upper part of the press main frame comprises a header frame 6. This header frame carries large brackets 7 which comprise heavy castings provided with bearings 8 that are adapted to receive the trunnions of the core bearing frame, as will hereinafter be described. These large brackets are provided with suitable strengthening ribs 9 and carry on their outer sides end thrust plates 10 to which are attached the end thrust collars 11, by means of lock nut stub bolts 12. The bearing frame 14 is provided with trunnions 15 which are adapted to rest in the bearings 8 of the brackets 7 and which are held in place by means of the axially arranged stub bolts 16 which pass through the bearing brackets 17 and into the ends of the trunnions. A space is provided between the ends of the trunnions and the bearing bracket 17, which space allows a reciprocating movement of trunnions 15 for the purpose of an automatic uniform adjustment of the load on the 2 baling rollers irrespective of the irregularities on the periphery of the bale which is never a perfect cylinder. This arrangement permits an endwise adjustment of the bearing frame in order to facilitate adjusting the bearing rollers to a proper position wherein the strain is equally divided between the pressure rollers. The bearing frame 14 is provided with an outer wall 19 and an inner wall 20. A large bearing roller 21 is mounted between the walls and in the upper portion of the bearing frame and slightly to one side of the mid vertical line or plane passing midway between the pressure rolls. The small bearing roller 22 is also mounted between the walls and nearer the axis of the trunnions of the bearing frame and upon the opposite side of the said vertical plane. The mounts of the large and small bearing rollers are so positioned that when the ends of the core bar 26 are in contact with the said bearing rollers the axis of the core bar will be intersected by the said vertical plane midway between the pressure rolls and the axis of the said trunnions. The journals of the bearing rollers are tapped and drilled in order to enable lubricant from the grease cups 24 to properly lubricate said journals. The bearing frame is provided with a peculiar elongated opening 25, the larger part of which is of sufficient size to permit the endwise removal or insertion of the core bar 26. By referring to Fig. 3 it will be noted that the body portion 27 of the core bar 26 is tapered, and from Figs. 1 and 3 it will be noted that both ends of the core bar are reduced to form cylindrical bearing journals 28 which contact with the large and small bearing rollers. Since the core bar is in intimate contact with the cotton and therefore no lubricant can be used on the ends of the core bar comprising the journals since such would necessarily come in contact with and absolutely ruin the cotton. The bearing previously described it will be noted being a roller bearing renders it unnecessary to lubricate the journal portions of the core bar whereby the core bar may be maintained bright and clean.

In the operation of the device the core bar is placed in position through the openings 25 in the bearing frame, and when the crosshead 2, carrying the pressure rollers 4 and 5, is raised to contact with the core bar and the end of the cotton bat passed between the core bar and the pressure rolls, the bat will wind upon the core bar since the pressure rolls are both rotated in the same direction. A continued rotation of the pressure rolls causes the bat to accumulate upon the core bar and thereby gradually lifts the core bar, and a slight lifting movement of the core bar causes the bearing ends to engage with the bearing rollers. As the rotation continues and the bat continues to wrap on the core bar, obviously, the accumulation of material produces a gradually increasing pressure between the pressure rolls and the core bar, which pressure is sustained by the bearing rollers. This pressure is permitted to increase up to a predetermined point, at which time the pressure rolls are permitted to gradually recede against hydrostatic pressure. If at any time there is a tendency of the core bar to creep endwise, such endwise movement is stopped by the circular bearing plates 11 contacting with the ends of the core bar and no further endwise movement is possible. As previously specified, the bearing rolls are mounted within the bearing frame which in turn is mounted upon trunnions so that any irregularity is immediately taken up and accommodated in such manner as to obviate undesirable side strains and abnormal stresses.

Having thus described my invention, what I claim is:—

1. In a device of the character described, in combination, a main frame, pressure rollers supported by said main frame, a core bar, said pressure rollers and said core bar being relatively movable, a bearing for said core bar constructed to maintain said core bar in a position whereby the axis of said core bar is self adjustable at all times thereby substantially equalizing the baling energy between said pressure rolls, said bearing comprising a bearing frame pivotally mounted relative to said main frame, anti-friction rolls carried by said bearing frame, and thrust bearing mounted stationary relative to said main frame.

2. In a device of the class described, in combination, a main frame, pressure rollers carried by said main frame, a core bar, said core bar and said pressure rollers being relatively movable one to the other, bearings for supporting said core bar, said bearings comprising pivotally mounted bearing frames, a relatively large anti-friction bearing roller mounted on one side of a plane passing midway between said pressure rollers, a small bearing roller mounted upon the opposite side of the said plane, said bearing rollers being adapted to support said core bar in such manner that the larger bearing roller supports the greater amount of forces transmitted through said core bar from said pressure rollers.

3. In a device of the class described, a main frame, a cross-head mounted for movement and adapted to be guided by said main frame, pressure rollers mounted within said cross-head, a bearing bracket carried by said main frame, a bearing frame provided with trunnions adapted to be seated in bearings in said bracket and to rotate relative thereto, anti-friction rollers mounted in said bearing frame, and a thrust bearing carried by said bracket.

4. A device of the character described, comprising a relatively large bearing roller, a relatively small bearing roller, a core bar adapted to be supported by said bearing rollers in such manner that the line of pressure through said core bar intersects the larger roller at a point slightly offset from the point of contact between said core bar and said roller so that said larger roller sustains the majority of forces transmitted through said core bar, substantially as described.

5. In a bearing for baling presses, in combination, a main frame, a cross-head mounted to reciprocate in a vertical direction relative to said main frame, pressure rollers carried by said cross-head, a core bar and a bearing for said core bar, said bearing comprising a bearing frame pivotally mounted on said main frame, and a pair of bearing rollers mounted in said pivoted bearing frame, substantially as described.

6. In a device of the class described, in combination, a bearing for a core bar, said bearing comprising a pivoted bearing frame, a relatively large bearing roller mounted in said bearing frame, and a relatively small bearing roller mounted in said bearing frame adjacent the large roller, said rollers contacting with the core bar, substantially as described.

7. In a device of the character described, in combination, a main frame, pressure rollers carried by said main frame, a core bar, a bearing frame pivotally mounted relative to said main frame, said bearing frame being provided with trunnions, anti-friction rolls mounted in said bearing frame and adapted to support said core bar in such manner that the axis of said core bar and the axis of said trunnions lie in substantially the same plane and intersect at substantially right angles.

8. A device of the character described, comprising a main frame, a pivoted bearing frame mounted on said main frame, bearing rollers mounted within said pivoted frame in different horizontal planes with their axis substantially parallel, a core bar adapted to be supported upon said bearing rollers, and the axis about which said bearing frame is pivoted being substantially at right angles to the axis of said core bar.

9. A device of the character described, comprising a relatively large bearing roller, a relatively small bearing roller, and a core bar adapted to be supported by said bearing rollers in such manner that the points of contact therewith lie on opposite sides of the line of pressure through said core bar and at unequal distances therefrom.

JOHN A. TAFT.